United States Patent [19]

Koval

[11] 4,257,638
[45] Mar. 24, 1981

[54] HOOK LOAD PIN RETENTION SYSTEM

[75] Inventor: Edmund R. Koval, Tonawanda, N.Y.

[73] Assignee: Columbus McKinnon Corporation, Tonawanda, N.Y.

[21] Appl. No.: 619,596

[22] Filed: Oct. 6, 1975

[51] Int. Cl.³ .............................................. B66C 1/34
[52] U.S. Cl. ................................... 294/82 R; 59/93; 24/230.5 R
[58] Field of Search ..................... 294/82 R, 83 R, 78; 59/93, 95; 24/230.5 R, 230.5 BA, 230.5 AD, 230.5 BH, 230.5 LH, 230.5 AC, 230.5 S, 230.5 CS, 230.5 TH, 230.5 W, 230.5 SA, 230.5 SS, 231, 232, 241 R, 241 PL, 241 P, 241 PP, 241 TC, 241.5 B, 241 CH, 241 SL, 242

[56] References Cited

U.S. PATENT DOCUMENTS

| | | | |
|---|---|---|---|
| 630,001 | 8/1899 | Lyman | 278/65 |
| 1,198,139 | 9/1916 | Lyon | 24/241 SL |
| 1,836,169 | 12/1931 | Humphreys et al. | 59/93 |
| 3,250,171 | 5/1966 | Taylor | 294/82 R |
| 3,741,599 | 6/1973 | Drayton | 24/230.5 CR |
| 3,863,441 | 2/1975 | Kaufmann | 294/82 R |

FOREIGN PATENT DOCUMENTS

| | | | |
|---|---|---|---|
| 592427 | 2/1960 | Canada | 294/83 R |
| 220440 | 8/1924 | United Kingdom | 24/230.5 SS |

Primary Examiner—James B. Marbert
Attorney, Agent, or Firm—Bean, Kauffman & Bean

[57] ABSTRACT

A clevis type hook has one leg formed with a partially closed bore opening and another leg formed with a through bore opening arranged in axial alignment with the partially closed bore opening; the bore openings being sized to loosely rotatably support opposite ends of an oval load pin whose width diameter permits non-rotative slip-fitting within a load chain link. The load pin is removably retained within the bore openings by a retaining device fixed to the other clevis leg.

10 Claims, 4 Drawing Figures

HOOK LOAD PIN RETENTION SYSTEM

BACKGROUND OF THE INVENTION

Various attempts have been made to provide the simple and convenient arrangement for removably attaching a hook to a load lift chain. Of these, the simplest form would appear to involve forming the hook with a clevis whose legs are spaced apart sufficiently to receive the end link of a load chain and are through bored to receive a load pin, which is sized to be slip-fitted through the last link and to be end supported within the bore openings.

In these prior constructions, the load pins have been normally formed with either a circular or an oval cross-sectional configuration; the latter design serving to maximize shear strength and resistance to bending. Prior constructions of this type are disclosed for instance by U.S. Pat. Nos. 1,393,568 and 1,562,908.

SUMMARY OF THE INVENTION

The present invention is directed towards an improved hook load pin retention system and more particularly towards an improved clevis construction facilitating load pin assembly/disassembly operations, while minimizing the likelihood of unintentional removal of the load pin from operative engagement with the clevis and load chain during use of the hook.

DRAWINGS

The nature and mode of operation of the present invention is now more clearly described in the following detailed description taken with the accompanying drawings wherein.

DETAILED DESCRIPTION

Figure 1:
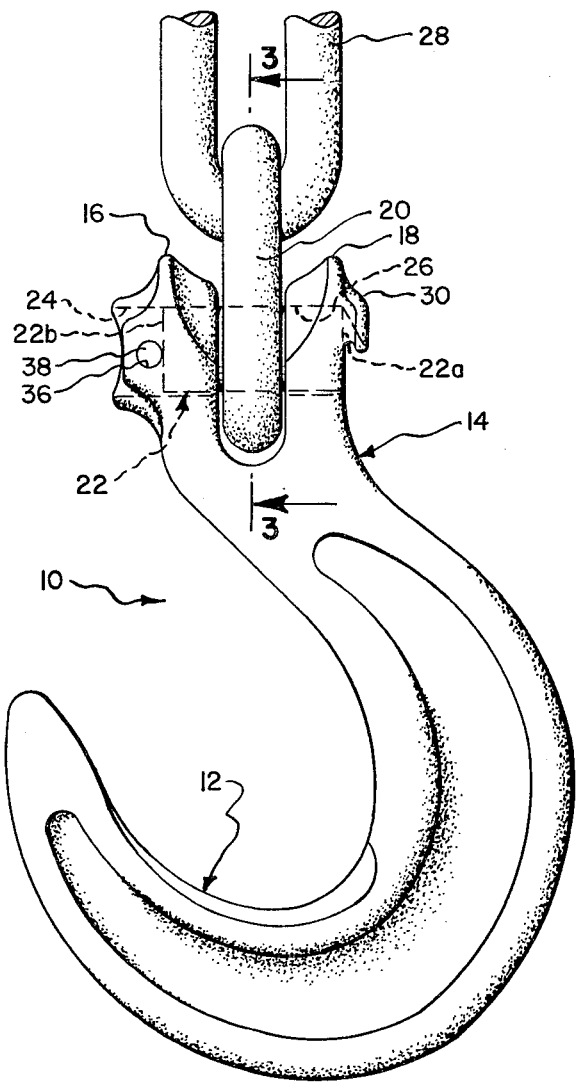
FIG. 1 is a front elevational view showing a hook formed in accordance with the present invention in association with a load chain.

Reference is now made particularly to FIG. 1, wherein 10 generally designates a hook characterized as including integrally formed hook body and clevis portions 12 and 14, respectively, wherein clevis first and second leg portions 16 and 18, respectively, are shown as being spaced apart sufficiently to receive the last link 20 of a load chain therebetween. A load pin 22 is adapted to be removably inserted through last link 20 and have its opposite ends supportingly received within first and second aligned openings 24 and 26 of clevis leg portions 16 and 18, respectively, for the purpose of removably interconnecting the hook and load chain.

In accordance with the preferred form of the present invention, load pin 22 is of an oval cross-sectional configuration, wherein its widthwise, minimum dimension is slightly less than the width of space within last link 20, whereby to permit slip fitting of the load pin within last link 20, while constraining rotational movements therebetween. On the other hand, the heightwise, maximum dimension of load pin 22, is slightly less than the size of clevis leg portion openings 24 and 26, which are preferably "bore" openings of circular cross-sectional configuration, whereby to permit both rotational and sliding movements of the load pin relative to the clevis. This arrangement is preferable to prior constructions, which prevent rotation of oval load pins relative to the clevis and thereby cause all relative movements to occur between last link 20 and next to last link 28, such that the load chain is subject to nonuniform wear conditions. In the present construction wherein load pin 22 is journaled by the clevis, the problem of nonuniform chain wear is alleviated without substantially shortening the life of the load pin and/or the clevis due to the substantial bearing area therebetween and the ability to choose materials for the load pin and/or clevis having substantially greater resistance to wear than the material from which the chain is conventionally formed. It would be preferable, however, to limit wear to the load pin inasmuch as it may be of relatively inexpensive construction and easily replaced.

Figure 2:
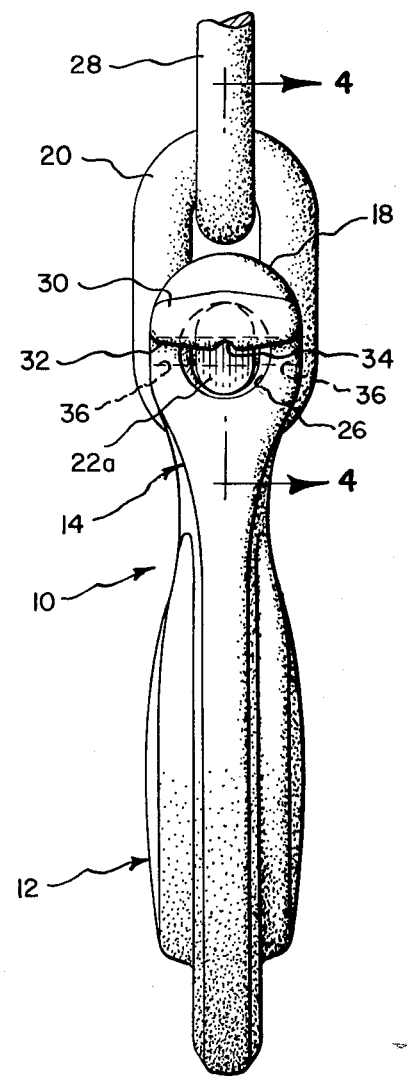
FIG. 2 is a side elevational view thereof.
Figure 4:
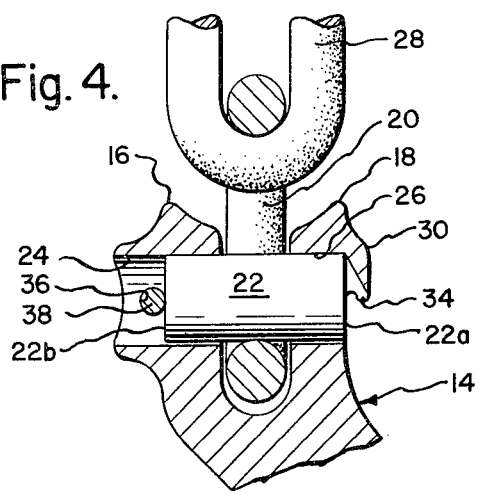
FIG. 4 is a sectional view taken generally along the line 4—4 in FIG. 2.
Figure 3:
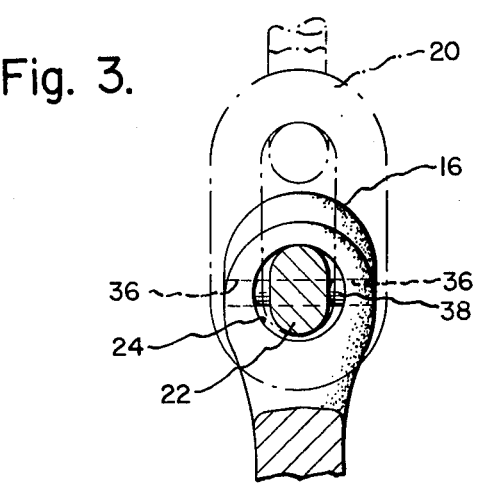
FIG. 3 is a sectional view taken generally along the line 3—3 in FIG. 1.

Further, in accordance with the present invention, a shield portion of abutment "hood" 30 is carried by leg portion 18 for the purpose of partially blocking or extending across the outer end of second bore opening 26, whereby to define an abutment arranged for engagement by the inserted end surface 22a of load pin 22, when the latter is inserted in succession through bore opening 24, link 20 and bore opening 26 during an assembly operation. However, shield portion 30 does not wholly block or cover the outer end of bore opening 26, thereby permitting insertion of a suitable tool, such as a drive punch, not shown, thereinto, for the purpose of forcing or driving load pin 22 from assembled relationship with clevis 14 and the last link 20 whenever the load pin has become worn and/or it is desired to disconnect the hook from the load chain. The illustrated configuration and positioning of shield portion 30 is nonetheless effective in preventing the unintentional engagement of external objects with inserted end surface 22a of load pin 22, during normal use of hook 10. More specifically, shield portion 30 is preferably formed integrally with leg portion 18 and arranged to project outwardly therefrom in a direction away from leg portion 16 and from adjacent its free or upper end in a direction downwardly towards hook body portion 12, as best shown in FIGS. 1 and 4. As best shown in FIG. 2, shield portion 30 is sized to overlie essentially one-half of bore opening 26 and is formed along its free or lower edge 32 with a drive punch receiving recess or notch 34 disposed essentially in alignment with the axis of bore openings 24 and 26. The term "partially blocking", as applied to shield portion 30, is meant to additionally include a construction, wherein the shield portion completely bridges across bore opening 26 and is formed with an axially extending through opening sized to receive a load pin removing punch.

Now referring primarily to FIGS. 1 and 4, it will be understood that the lengthwise dimension of load pin 22 is such that its opposite or outer end surface 22b is disposed within and spaced inwardly from the outer end of bore opening 24, when load pin 22 is fully inserted to position its inserted end surface 22a in abutting engagement with shield portion 30. Load pin 22 may be removably retained in its fully inserted position by forming leg portion 16 with a third bore opening 36, which is arranged to extend in a transversely directed intersecting relationship with bore opening 24, and removably fitting a suitable retaining pin device 38 within bore opening 36 for engagement with load pin end surface 22b. Pin device 38 may be variously defined, as for instance by a roll pin, set screw or the like, but preferably has its opposite ends supported within bore opening 36, such that its mid portion is arranged to engage opposite end surface 22b. Upon removal of retaining pin device 38 by an operator, load pin 22 may be removed from assembled relationship with clevis 14 and last link 20 in the manner described above.

The above described construction is economical from the standpoint that load pin 22 may be formed of uniform cross-sectional material and need be only of a length sufficient to provide for proper bearing engagement of its ends with the surfaces of bore openings 24 and 26. Moreover, the present construction has the advantage that one end of load pin 22 is releasably retained within bore openings 24 and 26 by the expedient of forming leg portion 18 with integral shield portion 30, which although serving as a permanent abutment for the load pin and preventing unintentional engagement thereof with external objects during normal use of hook 10, nonetheless permits ready operator access thereto when required to remove same from coupling engagement with clevis 14 and last link 20. Further, the provision and arrangement of pin device 38 serves to shield this additional load pin retainer, as well as the opposite end of the load pin, from engagement with external objects during use of the hook, and does not require the simple construction of the load pin to be modified in any way for the purpose of cooperating with the retaining pin.

I claim:

1. A load hook of the type adapted to be removably attached to the last link of a load chain, which comprises in combination:

a hook body formed integrally with a clevis having a pair of leg portions spaced apart for receiving said last link therebetween, a first of said leg portions being formed with a first bore opening extending therethrough and a second of said leg portions being formed with a second bore opening having an open end facing said first of said leg portions and arranged in axial alignment with said first bore opening, said second of leg portions carrying a shield portion partially blocking an end of said second bore opening spaced remotely relative to said first of said leg portions;

a load pin dimensioned to be removably inserted in succession through said first bore opening, said last link and said second bore opening for inserted end surface abutting engagement with said shield portion, said load pin being of a length such that its opposite end surface is disposed within and spaced inwardly of an outer end of said first bore opening when said inserted end surface is arranged in abutting engagement with said shield portion, said outer end of said first bore opening being spaced remotely relative to said second of said leg portions and retaining means removably bridging said first bore opening and spaced inwardly of said outer end of said first bore opening for engagement with said opposite end surface of said load pin whereby to cooperate with said shield portion to constrain said load pin against axially directed movements from bearing engagement with said first and second bore openings.

2. A load hook according to claim 1, wherein said load pin is of uniform cross-sectional configuration throughout the length thereof, and said load pin has a widthwise minimum dimension to permit said load pin to be slide fit within said last link while constrained from rotational movements relative thereto and a heightwise maximum dimension sized to permit said load pin to be slide and rotatably fixed within said first and second bore openings.

3. A load hook of the type adapted to be removably attached to the last link of a load chain, which comprises in combination:

a hook body formed integrally with a clevis having a pair of leg portions spaced apart for receiving said last link therebetween, a first of said leg portions being formed with a first bore opening extending therethrough and a second of said leg portions being formed with a second bore opening having an open end facing said first of said leg portions and arranged in axial alignment with said first bore opening, said second of said leg portions carrying a shield portion partially blocking an end of said second bore opening spaced remotely relative to said first of said leg portions, said shield portion being formed integrally with said second of said leg portions and projecting beyond said second of said leg portions in a direction away from said first of said leg portions and from adjacent a free end of said second of said leg portions in a direction towards said hook body;

a load pin dimensioned to be removably inserted in succession through said first bore opening, said last link and said second bore opening for inserted end surface abutting engagement with said shield portion, said load pin being of a length such that its opposite end surface is disposed within said first bore opening when said inserted end surface is arranged in abutting engagement with said shield portion; and retaining means removably bridging said first bore opening for engagement with said opposite end surface of said load pin whereby to cooperate with said shield portion to contrain said load pin against axially directed movements from bearing engagement with said first and second bore openings.

4. A hook according to claim 3, wherein said shield portion extends to overlie essentially one-half of said second bore opening and is formed along a free edge thereof with a drive punch receiving recess disposed essentially in alignment with the axis of said first and second bore openings.

5. A load hook of the type adapted to be removably attached to the last link of a load chain, which comprises in combination:

a hook body formed integrally with a clevis having a pair of leg portions spaced apart for receiving said last link therebetween, a first of said leg portions being formed with a first bore opening extending therethrough and a second of said leg portions being formed with a second bore opening having an open end facing said first of said leg portions and arranged in axial alignment with said first bore opening, said second of said leg portions carrying a shield portion partially blocking an end of said second bore opening spaced remotely relative to said first of said leg portions;

a load pin dimensioned to be removably inserted in succession through said first bore opening, said last link and said second bore opening for inserted end surface abutting engagement with said shield portion, said load pin being of a length such that its opposite end surface is disposed within and spaced inwardly from an outer end of said first bore opening when said inserted end surface is arranged in abutting engagement with said shield portion, said outer end of said first bore opening being spaced remotely relative to said second of said leg portions, said load pin being of oval cross-sectional configuration having a widthwise minimum dimension sized to be slide fit within said last link and a heightwise maximum dimension sized to be slide and rotatably fit within said first and second bore openings; and retaining means removably bridging said first bore opening and being spaced inwardly of said outer end of said first bore opening for engagement with said opposite end surface of said load pin whereby to cooperate with said shield portion to constrain said load pin against axially directed movements from bearing engagement with said first and second bore openings.

6. A load hook of the type adapted to be removably attached to the last link of a load chain, which comprises in combination:

a hook body formed integrally with a clevis having a pair of leg portions spaced apart for receiving said last link therebetween, a first of said leg portions being formed with a first bore opening extending therethrough and a second of said leg portions being formed with a second bore opening having an open end facing said first of said leg portions and arranged in axial alignment with said first bore opening, said second of said leg portions carrying a shield portion partially blocking an end of said second bore opening spaced remotely relative to said first of said leg portions, said shield portion is formed integrally with said second of said leg portions, said shield portion projecting beyond said second of said leg portions in a direction away from said first of said leg portions and from adjacent a free end of said second of said leg portions in a direction towards said hook body, said shield portion overlying essentially one-half of said second bore opening and being formed along a free edge thereof with a drive punch receiving recess disposed essentially in alignment with the axis of said first and second bore openings, said first of said leg portions is formed with a third bore opening extending in a transversely directed intersecting relationship with said first bore opening;

a load pin dimensioned to be removably inserted in succession through said first bore opening, said last link and said second bore opening for inserted end surface abutting engagement with said shield portion, said load pin being of a length such that its opposite end surface is disposed within said first bore opening when said inserted end surface is arranged in abutting engagement with said shield portion, said load pin being of oval cross-sectional configuration having a widthwise minimum dimension sized to be slide fit within said last link and a heightwise maximum dimension sized to be slide and rotatably fit within said first and second bore openings; and retaining means in the form of a pin device opposite end supported within said third bore opening for engagement with said opposite end surface of said load pin and cooperating with said shield portion to constrain said load pin against axially directed movements from bearing engagement with said first and second bore openings.

7. A load hook of the type adapted to be removably attached to the last link of a load chain, which comprises in combination:

a hook body formed integrally with a clevis having a pair of leg portions spaced apart for receiving said last link therebetween, a first of said leg portions being formed with a first bore opening extending therethrough and a second of said leg portions being formed with a second bore opening having an open end facing said first of said leg portions and arranged in axial alignment with said first bore opening, said second of said leg portions carrying a shield portion formed integrally therewith, said shield portion serving to define a permanent abutment for partially blocking an end of said second bore opening spaced remotely relative to said first of said leg portions;

a load pin having a uniform oval cross-sectional configuration throughout the length thereof and dimensioned to be removably inserted in succession through said first bore opening, said last link and said second bore opening for inserted end surface abutting engagement with said shield portion, said load pin being of a length such that its opposite end surface is disposed within and spaced inwardly of an outer end of said first bore opening when said inserted end surface is arranged in abutting engagement with said shield portion, said outer end of said first bore opening being spaced remotely relative to said second of said leg portions, said load pin having a widthwise minimum dimension sized to be slide fit within said last link and a heightwise maximum dimension sized to be slide and rotatably fit within said first and second bore openings; and retaining means removably bridging said first bore opening and spaced inwardly of said outer end of said first bore opening for engagement with said opposite end surface of said load pin whereby to cooperate with said shield portion to constrain said load pin against axially directed movements from bearing engagement with said first and second bore openings.

8. A load hook of the type adapted to be removably attached to the last link of a load chain, which comprises in combination:

a hook body formed integrally with a clevis having a pair of leg portions spaced apart for receiving said last link therebetween, a first of said leg portions being formed with a first bore opening extending therethrough and a second of said leg portions being formed with a second bore opening having an open end facing said first of said leg portions and arranged in axial alignment with said first bore opening, said second of said leg portions carrying a shield portion partially blocking an end of said second bore opening spaced remotely relative to said first of said leg portions, said first of said leg portions being formed with a third bore opening extending in a transversely directed intersecting relationship with said first bore opening;

a load pin dimensioned to be removably inserted in succession through said first bore opening, said last link and said second bore opening for inserted end surface abutting engagement with said shield portion, said load pin being of a length such that its opposite end surface is disposed within said first bore opening when said inserted end surface is arranged in abutting engagement with said shield portion, said load pin being of uniform cross-sectional configuration throughout the length thereof; and retaining means in the form of a pin device removably bridging said first bore opening with its opposite ends supported within said third bore opening for engagement with said opposite end surface of said load pin whereby to cooperate with said shield portion to constrain said load pin against axially directed movements from bearing engagement with said first and second bore openings.

9. A load hook of the type adapted to be removably attached to the last link of a load chain, which comprises in combination:

a hook body formed integrally with a clevis having a pair of leg portions spaced apart for receiving said last link therebetween, a first of said leg portions being formed with a first bore opening and a second of said leg portions being formed with a second bore opening arranged in axial alignment with said first bore opening;

a load pin of oval cross-sectional configuration, said load pin having a widthwise minimum dimension sized to permit said load pin to be slide fit within said last link while constrained from rotational movements relative thereto and a heightwise maximum dimension sized to permit said load pin to be slide and rotatably fit within said first and second bore openings; and retaining means for releasably retaining said load pin within said first and second bore openings.

10. A load hook according to claim 9, wherein said load pin is of uniform cross-sectional configuration throughout the length thereof.

* * * * *